(12) United States Patent
Stouffer et al.

(10) Patent No.: US 8,887,923 B2
(45) Date of Patent: Nov. 18, 2014

(54) FILTER MEDIUM AND WATER FILTRATION SYSTEM INCLUDING THE SAME

(75) Inventors: Mark R. Stouffer, Middletown, CT (US); Eric C. Pemberton, Southington, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 162 days.

(21) Appl. No.: 12/934,102

(22) PCT Filed: Apr. 22, 2009

(86) PCT No.: PCT/US2009/041325
§ 371 (c)(1),
(2), (4) Date: Sep. 23, 2010

(87) PCT Pub. No.: WO2009/140033
PCT Pub. Date: Nov. 19, 2009

(65) Prior Publication Data
US 2011/0042298 A1    Feb. 24, 2011

Related U.S. Application Data

(60) Provisional application No. 61/053,173, filed on May 14, 2008.

(51) Int. Cl.
*C02F 1/28* (2006.01)
*B01D 39/20* (2006.01)
*B01J 20/20* (2006.01)
*B01J 20/28* (2006.01)
*C02F 1/42* (2006.01)
*C02F 101/36* (2006.01)
*C02F 101/38* (2006.01)

(52) U.S. Cl.
CPC .............. *B01J 20/20* (2013.01); *B01D 39/2062* (2013.01); *C02F 2101/36* (2013.01); *C02F 2101/38* (2013.01); *C02F 1/283* (2013.01); *B01J 20/28004* (2013.01); *C02F 2201/006* (2013.01); *B01J 20/28042* (2013.01); *B01D 2239/086* (2013.01); *B01D 2238/0407* (2013.01); *B01J 20/2803* (2013.01); *C02F 1/42* (2013.01); *B01D 2239/125* (2013.01)
USPC ........ 210/444; 210/496; 210/502.1; 210/504; 210/510.1

(58) Field of Classification Search
USPC ........... 210/444, 496, 502.1, 510.1, 694, 903, 210/504; 502/430–434
See application file for complete search history.

(56) References Cited

U.S. PATENT DOCUMENTS 4,624,937 A    11/1986  Chou
(Continued)

FOREIGN PATENT DOCUMENTS

| WO | WO 02/41970 A1 | 5/2002 |
|----|----|----|
| WO | WO 03/095368 A1 | 11/2003 |
| WO | WO 2007/109774 A2 | 9/2007 |

OTHER PUBLICATIONS

International Search Report, PCT/US2009/041325, Mar. 16, 2010, 4 pages.
(Continued)

*Primary Examiner* — Matthew O Savage
(74) *Attorney, Agent, or Firm* — Bradford B. Wright

(57) ABSTRACT

A filter medium comprises: a) 55 to 80 percent by weight of activated carbon particles having a $D_{50}$ of 70 to 130 micrometers and a $D_{10}$ of 25 to 50 micrometers; b) 5 to 20 percent by weight of first catalytic activated carbon particles having a D50 in a range of 20 to 40 micrometers and a $D_{10}$ of 2 to 20 micrometers; and c) 10 to 30 percent by weight of a thermoplastic binder that binds at least the activated carbon particles and the catalytic activated carbon particles into a porous unitary body, wherein the percent by weight of components a)-c) is based upon a total weight of components a)-c). A water filtration system including the filter medium is also disclosed.

14 Claims, 2 Drawing Sheets

(56) References Cited

U.S. PATENT DOCUMENTS

| | | | |
|---|---|---|---|
| 5,249,948 A | 10/1993 | Koslow | |
| 5,338,458 A | 8/1994 | Carrubba et al. | |
| 5,470,748 A | 11/1995 | Hayden et al. | |
| 5,907,958 A * | 6/1999 | Coates et al. | 62/338 |
| 6,257,242 B1 | 7/2001 | Stavridis | |
| 6,342,129 B1 | 1/2002 | Vaughn et al. | |
| 6,368,504 B1 | 4/2002 | Kuennen et al. | |
| 6,398,965 B1 | 6/2002 | Arba et al. | |
| 6,579,445 B2 | 6/2003 | Nachtman et al. | |
| 6,706,194 B2 | 3/2004 | Baker et al. | |
| 7,112,272 B2 | 9/2006 | Hughes et al. | |
| 7,112,280 B2 | 9/2006 | Hughes et al. | |
| 7,169,304 B2 | 1/2007 | Hughes et al. | |
| 7,169,466 B2 | 1/2007 | Taylor et al. | |
| 7,229,552 B1 | 6/2007 | Levy | |
| 7,264,726 B1 * | 9/2007 | Levy | 210/502.1 |
| 7,297,263 B2 | 11/2007 | Nelson et al. | |
| 2003/0209497 A1 | 11/2003 | Baker et al. | |
| 2003/0209498 A1 | 11/2003 | Baker et al. | |
| 2005/0167358 A1 | 8/2005 | Taylor et al. | |
| 2005/0260396 A1 | 11/2005 | Taylor et al. | |
| 2006/0000763 A1 * | 1/2006 | Rinker et al. | 210/282 |
| 2006/0207925 A1 * | 9/2006 | Levy | 210/282 |
| 2007/0221569 A1 | 9/2007 | Stouffer et al. | |
| 2007/0222101 A1 | 9/2007 | Stouffer et al. | |
| 2010/0176044 A1 * | 7/2010 | Domb et al. | 210/205 |

OTHER PUBLICATIONS

Written Opinion of the International Searching Authority, PCT/US2009/041325, Mar. 16, 2010, 8 pages.

Calgon Carbon Corporation, "A New Weapon in the Chloramine Battle", Application Bulletin, 1997, 4 pages.

Huang et al., "Nitrogen-containing carbons from phenol-formaldehyde resins and their catalytic activity in NO reduction with $NH_3$", Carbon, vol. 41, 2003, pp. 951-957.

Singoredjo et al., "Modified Activated Carbons for the Selective Catalytic Reduction of NO with $NH_3$", Carbon, vol. 31, 1993, pp. 213-222.

Product Bulletin "Centaur HSL Granular Activated Carbon", Calgon Carbon Corporation, 1998, 2 pages.

Bagreev et al., "Bituminous coal-based activated carbons modified with nitrogen as adsorbents of hydrogen sulfide", Carbo, vol. 42, 2004, pp. 469-476.

Fairey et al., "Impact of Natural Organic Matter on Monochloramine Reduction by Granular Activated Carbon: The Role of Porosity and Electrostatic Surface Properties", Environmental Science & Technology, vol. 40, No. 13, 2006, pp. 4268-4273.

Product Data Bulletin, "NUCHAR® Aquaguard", MeadWestVaco Corp., 2002, 1 page.

Anonymous, "Powdered Carbon Specially Suited for Carbon Block Production: PGW & PGWH", Kuraray Chemicals, XP002573442, Retrieved from the Internet:URL:http://www.kuraraychemical.com/Products/pgw/pgw.htm retrieved on Mar. 16, 2010.

Bauman, "How to decide when to remove chloramines", Water Technology, vol. 22, Issue 12, Dec. 1999, 3 pages.

* cited by examiner

FILTER MEDIUM AND WATER FILTRATION SYSTEM INCLUDING THE SAME

CROSS-REFERENCE TO RELATED APPLICATIONS

This application is a national stage filing under 35 U.S.C. 371 of PCT/US2009/041325, filed Apr. 22, 2009, the disclosure of which is incorporated by reference in its entirety herein, and which claims priority to U.S. Provisional Application No. 61/053,173, filed 14 May 2008.

FIELD

The present disclosure relates generally to filters and systems for water filtration.

BACKGROUND

Traditional methods of removing impurities in water include the use of activated carbon filters. One common type of activated carbon filter is known as a "carbon block filter". Carbon block filters have activated carbon particles held together by a thermoplastic binder and are typically molded or extruded to form a shaped block (for example, a hollow cylinder or a disk).

The use of chloramine instead of chlorine as a disinfectant for municipal water treatment is becoming more common in the United States and other countries. In general, chloramine imparts a bad taste to water making its removal desirable for some applications (for example, drinking water).

Removal of chloramine with activated carbon is substantially more difficult than removal of chlorine. Because of the difficulty in removing chloramine, activated carbon manufacturers (for example, MeadWestvaco and Calgon Carbon) have developed carbons known in the art as "catalytic activated carbon" with enhanced catalytic activity for removal of chloramine as compared to traditional activated carbons. Even with such carbons, substantially more contact time is required for chloramine removal than most other chemical contaminants found in municipal water.

As a result, state-of-the-art filters for chloramine removal are generally large and are often designed for removal of chloramine only. Such filters have application to commercial water filtration, for example, food service applications, but are poorly suited for residential use where filters desirably have a relatively small physical size and remove multiple contaminants.

SUMMARY

In one aspect, the present disclosure provides a filter medium comprising components:
a) from 55 to 80 percent by weight of activated carbon particles having a particle size distribution with a $D_{50}$ in a range of from 70 to 130 micrometers and a $D_{10}$ in a range of from 25 to 50 micrometers;
b) from 5 to 20 percent by weight of first catalytic activated carbon particles having a particle size distribution with a $D_{50}$ in a range of from 20 to 40 micrometers and a $D_{10}$ in a range of from 2 to 20 micrometers; and
c) from 10 to 30 percent by weight of a thermoplastic binder, the thermoplastic binder binding at least the activated carbon particles and the catalytic activated carbon particles into a porous unitary body,
wherein the percent by weight of components a)-c) is based upon a total weight of components a)-c).

In another aspect, the present disclosure provides a water filtration system comprising:
a housing having an inlet port fluidly connected to an outlet port; and
a filter medium positioned within the housing such that water entering the housing through the inlet port passes through the filter medium before reaching the outlet port, the filter medium comprising components:
a) from 55 to 80 percent by weight of activated carbon particles having a particle size distribution with a $D_{50}$ in a range of from 70 to 130 micrometers and a $D_{10}$ in a range of from 25 to 50 micrometers;
b) from 5 to 20 percent by weight of first catalytic activated carbon particles having a particle size distribution with a $D_{50}$ in a range of from 20 to 40 micrometers and a $D_{10}$ in a range of from 2 to 20 micrometers; and
c) from 10 to 30 percent by weight of a thermoplastic binder, the thermoplastic binder binding at least the activated carbon particles and the catalytic activated carbon particles into a porous unitary body,
wherein the percent by weight of components a)-c) is based upon a total weight of components a)-c).

In some embodiments, the housing comprises a head part and a body part, the head part comprising the inlet port and the outlet port, the head part and the body part being mechanically engageable with one another to form a watertight seal. In some of these embodiments, the head part and the body part is mechanically engageable by a motion comprising relative twisting of the head part and the body part.

In some embodiments, the filter medium further comprises at least one lead removal medium in an amount up to 20 percent by weight. In some of these embodiments, the at least one lead removal medium comprises a cation exchange resin. In some embodiments, the filter medium further comprises up to 20 percent by weight of second catalytic activated carbon particles having a particle size distribution with a $D_{50}$ in a range of from 130 to 140 micrometers and a $D_{10}$ in a range of from 70 to 80 micrometers. In some embodiments, the thermoplastic binder comprises a thermoplastic polyolefin. In some embodiments, the porous unitary body has a conduit formed therein substantially along a longitudinal axis of the filter medium.

Advantageously, filter media according to the present disclosure have a relatively high capacity for removal of chloramine simultaneously with other water contaminants (for example, VOCs, trihalomethanes, lead, cystosporidium, etc.). Further, filter media according to the present disclosure can be made in compact sizes that achieve a relatively high capacity for removing chloramine, VOCs, optionally lead, and other contaminants from water as compared to prior filter media, while simultaneously achieving a substantial rate of flow.

Unless otherwise indicated, or clearly erroneous, it is envisaged that in reference to aspects of the present disclosure, any combination of the foregoing embodiments may be used in practice of the present disclosure.

As used herein,
"catalytic activated carbon" has its ordinary meaning in the water filtration art, and refers to activated carbon (not chemically impregnated) that has been prepared in a such a manner that it is substantially more effective for catalytically decomposing chloramine in water than activated carbon;
"activated carbon" refers to activated carbon other than catalytic activated carbon, which is excluded;
"$D_{10}$" refers to the particle size for which only 10 percent by volume of the particles in a particle distribution are smaller;

"$D_{50}$" refers to the particle size for which 50 percent by volume of the particles in a particle distribution are smaller (also commonly referred to in the art as the average or mean particle size);

"$D_{90}$" refers to that particle size for which 90 percent by volume of the particles in a particle distribution are smaller; and "porous unitary body" refers to a single body having a continuous network of pores extending throughout its interior.

DETAILED DESCRIPTION

Figure 1A:
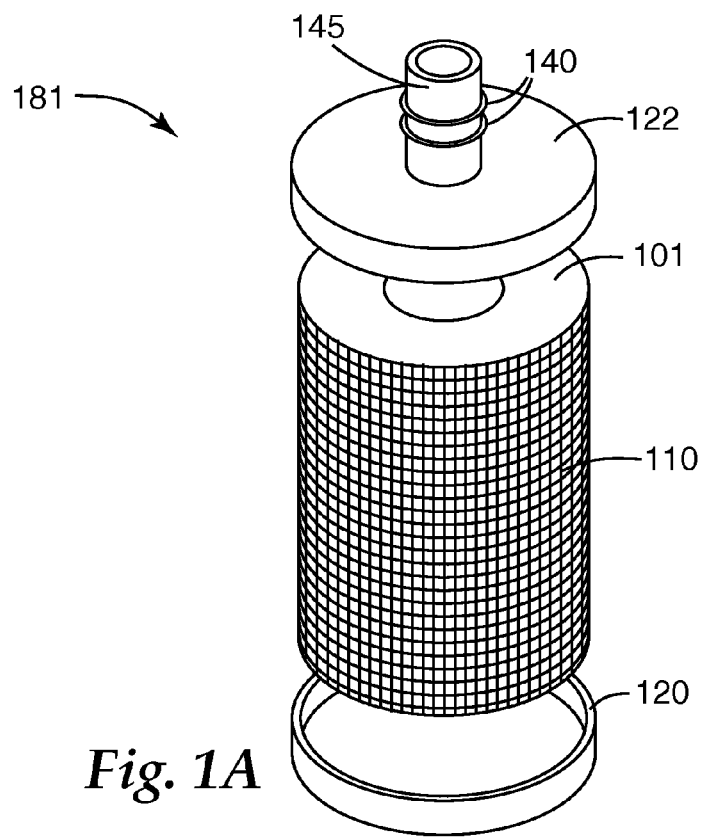
FIG. 1A is an exploded perspective view of an exemplary carbon block filter cartridge comprising a hollow cylindrical filter medium according to the present disclosure.
Figure 1B:
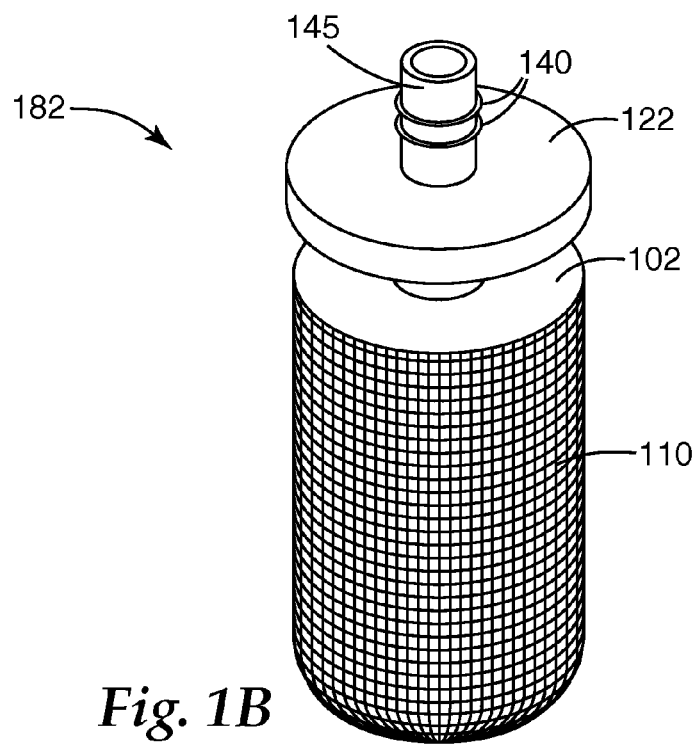
FIG. 1B is an exploded perspective view of an exemplary carbon block filter cartridge comprising a thimble-shaped filter medium according to the present disclosure.

A filter medium according to the present disclosure comprises: a) from 55 to 80 percent by weight of activated carbon particles having a particle size distribution with a $D_{50}$ in a range of from 70 to 130 micrometers and a $D_{10}$ in a range of from 25 to 50 micrometers; b) from 5 to 20 percent by weight of first catalytic activated carbon particles having a particle size distribution with a $D_{50}$ in a range of from 20 to 40 micrometers and a $D_{10}$ in a range of from 2 to 20 micrometers; and c) from 10 to 30 percent by weight of a thermoplastic binder, the thermoplastic binder binding at least the activated carbon particles and the catalytic activated carbon particles into a porous unitary body, wherein the percent by weight of components a)-c) is based upon a total weight of components a)-c). The filter medium may have any shape, although it is typically sized and shaped for use in a particular filtration system. For example, as shown in FIGS. 1A-1C, filter media according to the present disclosure may be shaped as a hollow cylinder (for example, see filter medium 101 in FIG. 1A), a thimble (for example, see filter medium 102 in FIG. 1B), or a disc (for example, see disc-shaped filter medium 203 in FIG. 2). Optionally, one or more ends of the filter medium may be capped with a respective end cap.

For example, FIG. 1A shows an exemplary filter cartridge 181 having a filter medium 101 (shaped as a hollow cylinder). Filter medium 101 is adhesively sealed to a closed cap 120, and a cap 122. Cap 122 has an outlet port tube 145 fitted with o-rings 140 (typically made of elastic material such as, for example, natural rubber, silicone, or fluoroelastomer) that is adapted to engage a fitting in a corresponding housing (not shown). Optional mesh 110 assists in protecting filter medium 101; for example, during handling. Optional mesh 110 may be for example, plastic netting, scrim, fabric, or metal screen.

FIG. 1B shows another exemplary filter cartridge 182 having a thimble-shaped filter medium 102. Filter medium 102 is adhesively sealed to cap 122 as shown in FIG. 1A. Cap 122 has an outlet port tube 145 fitted with o-rings 140 that is adapted to engage a fitting in a corresponding housing (not shown). Optional mesh 110 assists in protecting filter medium 101.

Figure 2:
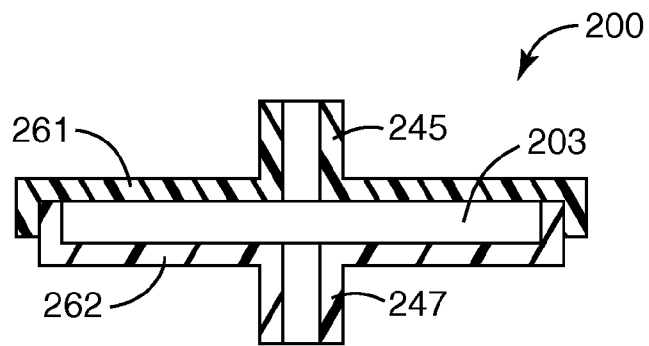
FIG. 2 is a cross-sectional side view of an exemplary water filtration system comprising a filter medium according to the present disclosure.

FIG. 2 shows an exemplary water filtration system 200 having a disc-shaped filter medium 203. Disc-shaped filter medium 203 is adhesively sealed between inlet port cap 261 having inlet port 245 and outlet port cap 262 having outlet port 247.

Activated carbon is generally produced from carbonaceous source materials such as, for example, nutshells, bamboo, bone, coconut shell, wood, or coal. Activated carbon can be produced by carbonization in combination with activation/oxidation. During carbonization, raw carboniferous material is pyrolyzed at a temperature in the range 600-900° C. in absence of air (for example, in a nitrogen or argon atmosphere). In activation/oxidation the raw carboniferous material or carbonized material is exposed to oxidizing atmospheres (for example, carbon dioxide, oxygen, or steam) at temperatures above 250° C., usually in the temperature range of 600-1200° C. In some cases, impregnation with chemicals such as acids (for example, phosphoric acid) or bases (for example, potassium hydroxide), or metal salts (for example, zinc chloride), followed by carbonization at temperatures in the range of 450-900° C.

Activated carbon generally binds materials by adsorption. Once prepared, the activated carbon can be comminuted to the desired particles size distribution by any suitable technique (for example, by crushing and/or milling), typically followed by classifying the resultant powder (for example, by air classifying or sieving) to obtain a particle size distribution having an average particle size (that is, $D_{50}$) in a range of from 70 to 130 micrometers and a $D_{10}$ in a range of from 25 to 50 micrometers. Commercial suppliers of activated carbon powder are numerous, and include, for example: Calgon Carbon Corp., Pittsburgh, Pa.; MeadWestvaco Corp., Glen Allen, Va.; and Kuraray Co., Ltd., Okayama, Japan (for example, as described in Table 1 of the Examples).

Blends and mixtures of activated carbon powders can also be used. In such cases, each may have a different particle size distribution as long as the overall combination has a particle size distribution within the desired range.

Filter media according to the present disclosure comprise from 55 to 80 percent by weight of activated carbon particles having a particle size distribution with a $D_{50}$ in a range of from 20 to 40 micrometers and a $D_{10}$ in a range of from 2 to 20 micrometers, based on the total weight of components a)-c). For example, the activated carbon particles may be present in an amount of from 55, 60, or 65 percent up to 70, 75, or even 80 percent by weight, based on the total weight a components a) to c).

Catalytic activated carbons are typically produced by charring processes similar to those for making activated carbons, but including a nitrogen-containing material (for example, ammonia, urea, etc.) at some point in the process. The resultant catalytic activated carbon effectively catalytically decomposes chloramine in the water. Catalytic activated carbon can be prepared, for example, according to the procedure described in U.S. Pat. Nos. 6,342,129 (Vaughn et al.) and 5,338,458 (Carrubba). Catalytic activated carbon (bituminous-based) believed to be made in this way is commercially available from Calgon Carbon Corp. under the trade designation "Centaur". Catalytic activated carbon can also be prepared, for example, by the method disclosed in U.S. Pat. No. 6,706,194 B2 (Baker et al.), which refers in turn to U.S. Pat. No. 4,624,937 (Chou)). In this method, a nitrogen source such as ammonia is included with an oxidizing gas during the activation/oxidation step. Commercial sources of catalytic activated carbons of this type are believed to include, for example, catalytic activated carbon marketed by MeadWestvaco Corp. under the trade designation "Nuchar AquaGuard".

In the event that commercially available size distributions of the activated carbon particles and/or catalytic activated carbon particles are not of the desired size distribution, comminution and/or classification of the catalytic activated carbon particles (for example, granules or powder) may be carried out, for example, using well-known techniques such as crushing and/or milling, and/or air classifying and/or sieving.

Filter media according to the present disclosure comprise from 5 to 20 percent by weight of catalytic activated carbon particles having a particle size distribution with a $D_{50}$ in a range of from 20 to 40 micrometers and a $D_{10}$ in a range of from 2 to 20 micrometers, based on the total weight of components a)-c). For example, the activated carbon particles may be present in an amount of from 5 or 10 percent up to 15 or 20 percent, based on the total weight a components a) to c).

In some embodiments, a second catalytic activated carbon, which may have the same or different chemical composition from the first catalytic activated carbon, but having a larger particle size range, may also be included in filter media according to the present disclosure. For example, the second catalytic activated carbon particles having a particle size distribution with a $D_{50}$ in a range of from 130 to 140 micrometers and a $D_{10}$ in a range of from 70 to 80 micrometers may be included in the filter medium in an amount of up to 20 percent (for example, in a range of from 0.1 to 5, 10, 15 or even 20 percent) by weight based on the total weight of components a)-c).

Filter media according to the present disclosure include from 10 to 30 percent by weight, based on the total weight of components a)-c), of a thermoplastic binder that binds the activated carbon particles and the catalytic activated carbon particles into a porous unitary body (for example, as a carbon block filter). In general, for drinking water applications the thermoplastic binder should be of material that is approved for direct food contact, although for other applications, this may not be a consideration. Blends and mixtures of thermoplastic polymers can be used as the thermoplastic binder. Examples of suitable thermoplastic polymers include polyolefins (for example, polyethylene and polypropylene), polyamides, polyesters, cellulose esters, cellulose ethers, ethylene-vinyl acetate copolymers, and combinations thereof. To facilitate fabrication of the porous unitary body, the thermoplastic binder is typically used in a granular or, more typically, powdered form. In some embodiments, the binder comprises a high-density polyethylene, especially of the GUR type as available from Ticona, Florence, Ky.

Optionally, filter media according to the present disclosure may further comprise one or more lead removal media. Useful lead removal media include, for example, activated alumina and cation exchange resins. For example, activated alumina beads can be used. Also useful are lead removal media such as ATS (titanium silicate), for example, as marketed by BASF Corp., Parsippany, N.J. under the trade designation ATS Powder. Combinations of lead removal media may also be used. If present, the amount of any lead removal media is typically adjusted for the intend use (for example, depending on the relative amounts of lead and other contaminants).

Filter media according to the present disclosure are typically formed by mixing the components a)-c) and any optional components, placing the mixture into a mold, typically with compacting (for example, by ultrasonic vibration or impulse filling) and heating the mixture to a temperature where the thermoplastic binder softens sufficiently that, upon cooling, the components are fused into a porous unitary body.

The term "impulse filling" means that a force is applied to the mold, causing a discrete, substantially vertical displacement that induces movement of at least a portion of the particles in the mold, causing the particles to assume a compact orientation in the mold. This includes indirect methods such as hammer blows to a table to which the molds are clamped and impacts to the table from a pneumatic cylinder, and any suitable direct methods that displace the molds with a series of jarring motions. The impulse filling may include a series of discrete displacements (that is, impulses) applied to the mold. Impulse filling differs from vibration in that there is a period of non-movement or of little movement between the displacements. The period between displacements is typically at least 0.5 (in some embodiments, at least 1, 2, 3, 5, or even at least 10) seconds.

Typically, filter media according to the present disclosure have shape and dimensions such that they can effectively serve as carbon block filters (for example, is adapted for use as a filter cartridge), although this is not a requirement. Filter media according to the present disclosure may further comprise additional material used to remove contaminant(s) including, for example, diatomaceous earth, antimicrobial media, silicas, zeolites, aluminas, ion exchangers, arsenic removal media, charge modified particles, titanium silicates, titanium oxides, metal oxides and/or hydroxides, and combinations thereof.

Advantageously, filter media according to the present disclosure can be prepared that have a higher capacity per unit volume (that is, translating to longer filter cartridge life) than comparably sized and shaped filters in the art.

Filter media according to the present disclosure are generally fabricated so they are operable at a substantial flow rate of 0.5, 0.75 1, 1.5, 2, 3, 4, or even 5 gallons per minute flow through for water at typical municipal water supply pressures, although this is not a requirement (for example, the operating water pressure may be lower or higher).

Typically, pressure drop across a filter medium inversely correlates with flow rate through the filter medium. Pressure drop typically depends on, for example, the size and porosity of the filter medium. Higher pressure drops are typically associated with higher filter capacity for removal of contaminants per unit volume (that is, compact filters), but they are also typically associated with reduced filter life due to physical damage to the filter medium. Accordingly there is typically a balancing of properties depending on the intended use. For example, refrigerator filters typically are designed to have a maximum pressure drop of about 25 pounds per square inch (psi, 170 kPa) and a flow rate of at least about 0.5 gallons/minute (1.9 liters/minute), while food service filters typically are designed to have a maximum pressure drop of about 15 psi (100 kPa) and a flow rate of at least about 5 gallons/minute (19 liters/minute), and point of entry filters typically are designed to have a maximum pressure drop of about 5 psi (34 kPa) and a flow rate of at least about 10 gallons/minute (38 liters/minute). Filter media according to the present disclosure may be fabricated to have any desired pressure drop and/or flow rate; for example, depending on the intended application.

Figure 3:
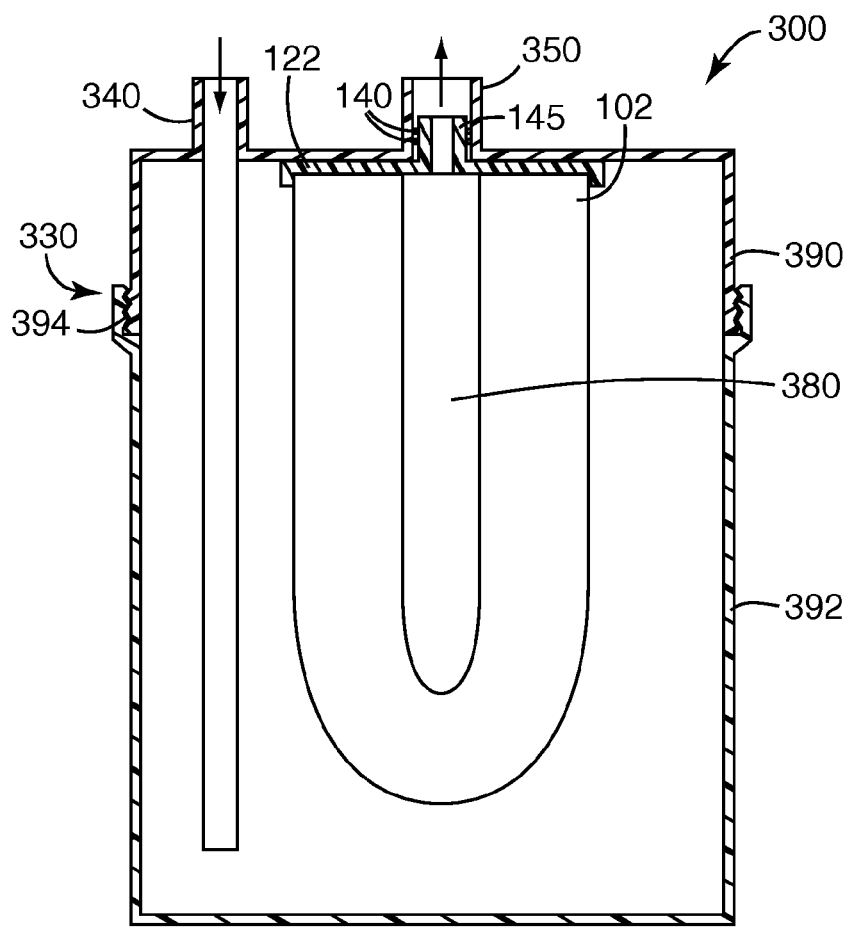
FIG. 3 is a cross-sectional side view of an exemplary water filtration system comprising a filter medium according to the present disclosure.

Filter media according to the present disclosure are useful, for example, in a water filtration system. FIG. 3 shows an exemplary water filtration system 300. Water filtration system 300 comprises housing 330 having inlet port 340 fluidly connected to outlet port 350. Filter medium 102 according to the present disclosure is sealed with cap 122 and positioned within the housing 330 such that any water (not shown) entering housing 330 through inlet port 340 passes through filter medium 102 into conduit 380 before reaching outlet port 350 and issuing therefrom. O-rings 140 form a watertight seal between outlet port 350 and outlet port tube 145 of cap 122.

As shown housing 330 comprises head portion 390 and body portion 392. Head portion 390 includes inlet port 340 and outlet port 350. Head portion 390 and body portion 392 are mechanically engageable (shown as screw threads 394) with one another to form a watertight seal. In such embodiments, the head portion and the body portion may be mechanically engageable by a motion comprising relative twisting of the head portion and the body portion (for example, a bayonet mount or a screw thread).

If desired, water filtration systems according to the present disclosure may be used in combination with one or more additional water conditioning elements. However, for point of use municipal drinking water applications (for example, as a tap filter) wherein chloramine is a contaminant, water filtration systems according to the present disclosure are typically sufficiently effective at contaminant removal that no downstream additional water conditioning elements are necessary.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the Examples and the rest of the specification are by weight. Table 1 (below) reports abbreviations used for materials in the Examples.

TABLE 1

MATERIALS USED IN THE EXAMPLES

| | |
|---|---|
| CC1 | catalytic activated carbon available as Nuchar AquaGuard Powder from MeadWestvaco Corp.; nominal particle size of −325 mesh; $D_{90} = 67.5$ micrometers; $D_{50} = 29.1$ micrometers; $D_{10} = 6.3$ micrometers. |
| CC2 | catalytic activated carbon available as Nuchar AquaGuard Powder, 80 × 325 mesh, from MeadWestvaco Corp.; $D_{90} = 217.8$ micrometers; $D_{50} = 131.5$ micrometers; $D_{10} = 78.0$ micrometers. |
| LRM | powdered absorbent marketed as MetSorb HMRP for removal of lead cations from water by Graver Technologies, Glasgow, DE; ca. 50 micrometers average particle size. |
| AC1 | high density, low surface area activated carbon (80 × 325 mesh) available as PGW-100MD from Kuraray Co., Ltd., Okayama, Japan; $D_{90} = 182.2$ micrometers; $D_{50} = 97.6$ micrometers; $D_{10} = 40.4$ micrometers. |
| AC2 | high density, low surface area activated carbon available as PGW-20MD from Kuraray Co., Ltd.; $D_{90} = 98.9$ micrometers; $D_{50} = 46.0$ micrometers; $D_{10} = 18.7$ micrometers. |
| PE1 | high molecular weight polyethylene powder available as GUR 2126 UHMW PE from Ticona, Florence, KY. |
| PE2 | high molecular weight polyethylene powder available as GUR 4150-3 UHMW PE from Ticona. |
| SIC | silver impregnated carbon powder available as Barnebey & Sutcliffe Type 1184 Bacteriostatic Water Filter Media from Barnebey & Sutcliffe, Columbus, OH. |

Example 1

Formulation 1 was consisted of: 10 parts of CC1, 50 parts of AC1, 10 parts of LRM, 15 parts of PE1, 5 parts PE2, and 10 parts of CC2.

Formulation 1 was used to fabricate blocks for residential chloramine applications as follows. Formulation 1 in an amount totaling about 3 gallons volume was charged into a container and mixed using a drill press fitted with a paint mixing paddle operating at about 600 rpm. The resulting mixture was added to molds (aluminum pipe with top and bottom plate and mandrel) on a filling table. The molds were designed to produce a hollow cylindrical block with a 2.4-inch (6.1-cm) outer diameter (OD) and a 0.75-inch (1.9-cm) inner diameter (ID). Mold filling was accomplished by adding the mixture to the molds while applying impulses (approximately one vertical displacement per every 3 seconds). The molds were then heated at about 180° C. in a convection oven for about 2 hours. The molds were cooled to room temperature and the resulting carbon blocks were ejected from the molds, and cut to 9.6-inch (24-cm) lengths. The resulting carbon blocks were then made into water filters by gluing end caps (one cap forming a seal, and the other end cap forming a seal having a protruding central tube) on the carbon blocks and inserting the end capped blocks into filter cartridge housings having a connector that engaged the central tube to form a watertight seal.

An end-capped carbon block prepared above was tested according to NSF Standard 53 entitled "Drinking Water Treatment Units—Health Effects" (2002, National Sanitation Foundation, Ann Arbor, Mich.), Volatile Organic Compound (VOC) reduction protocol (sec. 6.3.3), using 300 ppb chloroform as a challenge. The carbon block, operated at 0.75 gallons/minute (2.8 liters/minute) flow rate, exhibited a VOC capacity of approximately 900 gallons (3410 liters), equivalent to a VOC capacity per unit volume of 152 gallons/inch$^3$ (35.1 liters/cm$^3$). VOC capacity is defined as the number of gallons treated until a point is reached where the effluent chloroform concentration reaches 15 ppb.

An end-capped carbon block was tested according to the NSF Standard 53 (2002) lead reduction protocol (sec. 6.3.2), at a pH of 8.5 and 150 ppb of lead challenge. The carbon block, operated at 0.75 gallons/minute (2.8 liters/minute) flow rate, exhibited a lead capacity of exceeding 1400 gallons (5300 liters) equivalent to a lead capacity per unit volume exceeding 236 gallons/inch$^3$ (54.6 liters/cm$^3$). Lead capacity is defined as the number of gallons treated until a point is reached where the effluent lead concentration reaches 10 ppb.

An end-capped carbon block prepared above was tested according to NSF Standard 42 entitled "Drinking Water Treatment Units—Aesthetic Effects" (2002, National Sanitation Foundation, Ann Arbor, Mich.), chloramine reduction protocol (sec. 6.12.6.6), using 3 parts per million (ppm) chloramine challenge. The end-capped carbon block, operated at 0.75 gallons/minute (2.8 liters/minute) flow rate, exhibited a chloramine capacity of 1530 gallons (5680 liters), equivalent to a chloramine capacity per unit volume of 258 gallons/inch$^3$ (59.7 liters/cm$^3$).

An end-capped carbon block prepared above was tested according to the NSF Standard 53 protocol for removal of cryptosporidium (sec. 6.5). The carbon blocks tested passed this protocol showing over 99.95% reduction.

Comparative Example A

Formulation 2 consisted of: 20 parts of CC2, 30 parts of AC1, 20 parts of AC2, 10 parts of LRM, 15 parts of PE1, and 5 parts of PE2.

Using Formulation 2, carbon blocks were made and end-capped according to the procedure of Example 1.

An end-capped carbon block prepared above was tested according to NSF Standard 53 (2002), VOC reduction protocol (sec. 6.3.3), using 300 ppb chloroform as a challenge. The carbon block, operated at 0.75 gallons/minute (2.8 liters/minute) flow rate, exhibited a VOC capacity of approximately 900 gallons (3410 liters), equivalent to a VOC capacity per unit volume of 152 gallons/inch$^3$ (35.1 liters/cm$^3$).

An end-capped carbon block prepared above was tested according to the NSF Standard 53 (2002) lead reduction protocol (sec. 6.3.2), at a pH of 8.5 and 150 ppb of lead challenge. The carbon block, operated at 0.75 gallons/minute (2.8 liters/minute) flow rate, exhibited a lead capacity of exceeding 1400 gallons (5300 liters), equivalent to a lead capacity per unit volume exceeding 236 gallons/inch$^3$ (54.6 liters/cm$^3$).

An end-capped carbon block prepared above was tested according to the NSF Standard 42 (2002) chloramine reduction protocol (sec. 6.12.6.6), using 3 ppm chloramine challenge. The carbon block, operated at 0.75 gallons/minute (2.8 liters/minute) flow rate, exhibited a chloramine capacity of 598 gallons (2260 liters), equivalent to a chloramine capacity per unit volume of 101 gallons/inch$^3$ (23.3 liters/cm$^3$).

Comparative Example B

Formulation 3 consisted of: 60 parts of CC2, 10 parts of CC1, 10 parts of LRM, and 20 parts of PE1.

Using Formulation 3, carbon blocks were made and end-capped according to the procedure of Example 1. Carbon blocks (9.6-inch (24-cm) length), prepared above, were tested according to the NSF Standard 53 (2002) VOC reduction protocol using 300 ppb chloroform as a challenge.

An end-capped carbon block prepared above, and operated at 0.75 gallons/minute (2.8 liters/minute) flow rate, exhibited a VOC capacity of less than 100 gallons (liters), equivalent to a VOC capacity per unit volume of less than 16.9 gallons/inch$^3$ (3.90 liters/cm$^3$).

Example 2

Formulation 4 consisted of: 13 parts of CC1, 60 parts of AC1, 5 parts of LRM, 7 parts of CC2, 11 parts of PE1, and 4 part of PE2.

Formulation above was mixed according to the procedure of Example 1, and the mixture was added to molds (aluminum pipe with top and bottom plate and mandrel) on a filling table. The hollow cylindrical molds were designed for a 1.5 inch (3.8 cm) OD×0.75 inch (1.9 cm) ID×8 inches (20 cm) block suitable for a refrigerator filter. Mold filling was accomplished by adding the mixture to the molds while applying impulses (approximately one vertical displacement per every 3 seconds). The molds were then heated at about 180° C. in a convection oven for about 1 hour. The molds were then heated at about 180° C. in a convection oven for about 2 hours. The molds were cooled to room temperature and the resulting carbon blocks were ejected from the molds. The resultant carbon blocks, 1.5-inch (3.8-cm) OD×8-inch (20-cm), were then made into water filters by gluing end caps on the carbon blocks and inserting the end capped blocks into filter cartridge housings.

The end-capped carbon blocks were tested according to according to the NSF Standards 42 (2002) and 53 (2002) as in Example 1. Chloramine, lead, and VOC capacities were each in excess of 300 gallons (1140 liters), equivalent to chloramine, lead, and VOC capacities per unit volume in excess of 28.3 gallons/inch$^3$ (6.54 liters/cm$^3$).

Comparative Example C

Commercial replacement cartridges for a refrigerator filter (available as Kenmore Ultimate II T1 KB1 (T1RFKB1)) were obtained. Each filter (a carbon block filter) had dimensions of 1.5-inch (3.8-cm) OD×8-inch (20-cm).

The filters were individually tested according to according to NSF Standards 42 (2002) and 53 (2002) as in Example 1. Chloramine capacity was <50 gallon (<190 liters) and VOC capacity was 140 gallons (530 liters), equivalent to chloramine and VOC capacities per unit volume of less than 4.71 gallons/inch$^3$ (1.09 liters/cm$^3$) and 13.2 gallons/inch$^3$ (3.05 liters/cm$^3$).

Example 3

Formulation 5 consisted of: 60 parts of CC2, 10 parts of CC1, 25 parts of PE1, and 5 parts of PE2.

Formulation consisted of: 70 parts of CC2, 25 parts of PE1, and 5 parts of PE2.

Formulations 5 and 6 were separately mixed and molded according to the procedure of Example 1 using molds designed to produce a hollow cylindrical block, 3.0 inches (7.6 cm) OD x 0.75 inch (1.9 cm) ID x 5 inches (13-cm) length. The resultant carbon blocks were then made into water filters by gluing end caps on the carbon blocks and inserting the end capped blocks into filter cartridge housings.

The end-capped carbon blocks were tested according to NSF Standards 42 (2002) and 53 (2002) as in Example 1, except the water flow was continuous. In NSF Standards 42 and 53, a 10 minutes on / 10 minutes off duty cycle is used. The test was conducted continuously as an accelerated test.

Table 2 (below) reports the average chloramine capacity and pressure drop for two replicate runs.

TABLE 2

| | Chloramine capacity to 0.5 ppm breakthrough | Chloramine capacity per unit volume to 0.5 ppm breakthrough | Water Pressure Drop |
|---|---|---|---|
| Formulation 1 | 1250 gallons (4730 liters) | 37.7 gallons/inch$^3$ (8.72 liter/cm$^3$) | 5.0 psi (34 kPa) |
| Formulation 2 | 470 gallons (1780 liters) | 14.2 gallons/inch$^3$ (3.28 liter/cm$^3$) | 3.3 psi (23 kPa) |

Example 4

Formulation 7 consisted of: 13 parts of CC1, 60 parts of AC1, 7 parts of LRM, 3 parts of SIC, 12 parts of PE1, and 5 parts of PE2.

Formulation 7 was mixed and molded according to the procedure of Example 1 using molds designed to produce a hollow cylindrical block, 3.0 inches (7.6 cm) OD x 0.75 inch (1.9 cm) ID x 7.8 inches (20 cm) length. The resultant carbon blocks were then made into water filters by gluing end caps on the carbon blocks and inserting the end capped blocks into filter cartridge housings.

An end-capped carbon block prepared above was tested according to the NSF Standard 53 (2002) VOC reduction protocol (sec. 6.3.3), using 300 ppb chloroform as a challenge. The carbon block, operated at 0.75 gallons/minute (2.8 liters/minute) flow rate, exhibited a VOC capacity of approximately 1200 gallons (4500 liters), equivalent to a VOC capacity per unit volume of approximately 23.2 gallons/inch$^3$ (5.37 liters/cm$^3$).

An end-capped carbon block prepared above was tested according to NSF Standard 53 (2002) lead reduction protocol (sec. 6.3.2), at a pH of 8.5 and 150 ppb of lead challenge. The carbon block, operated at 0.75 gallons/minute (2.8 liters/minute) flow rate, exhibited a lead capacity of exceeding 1200 gallons (4500 liters), equivalent to a lead capacity per unit volume in excess of 23.2 gallons/inch$^3$ (5.37 liters/cm$^3$).

An end-capped carbon block prepared above was tested according to the NSF Standard 42 (2002) chloramine reduction protocol (sec. 6.12.6.6), using 3 ppm chloramine challenge. The carbon block, operated at 0.75 gallons/minute (2.8 liters/minute) flow rate, exhibited a chloramine capacity of 2200 gallons (8300 liters), equivalent to a chloramine capacity per unit volume in excess of 42.6 gallons/inch$^3$ (9.84 liters/cm$^3$).

The disclosures of all patents and publications cited hereinabove are incorporated herein by reference in their entirety.

Various modifications and alterations of this invention may be made by those skilled in the art without departing from the scope and spirit of this invention, and it should be understood that this invention is not to be unduly limited to the illustrative embodiments set forth herein.

What is claimed is:

1. A filter medium comprising components:
   a) from 55 to 80 percent by weight of activated carbon particles having a particle size distribution with a $D_{50}$ in a range of from 70 to 130 micrometers and a $D_{10}$ in a range of from 25 to 50 micrometers;
   b) from 5 to 20 percent by weight of first catalytic activated carbon particles having a particle size distribution with a $D_{50}$ in a range of from 20 to 40 micrometers and a $D_{10}$ in a range of from 2 to 20 micrometers; and
   c) from 10 to 30 percent by weight of a thermoplastic binder, the thermoplastic binder binding at least the activated carbon particles and the catalytic activated carbon particles into a porous unitary body,
   wherein the percent by weight of components a)-c) is based upon a total weight of components a)-c).

2. The filter medium of claim 1, further comprising at least one lead removal medium in an amount up to 20 percent by weight.

3. The filter medium of claim 2, the at least one lead removal medium comprising a cation exchange resin.

4. The filter medium of claim 1, further comprising up to 20 percent by weight of second catalytic activated carbon particles having a particle size distribution with a $D_{50}$ in a range of from 130 to 140 micrometers and a $D_{10}$ in a range of from 70 to 80 micrometers.

5. The filter medium of claim 1, the thermoplastic binder comprising a thermoplastic polyolefin.

6. The filter medium of claim 1, the porous unitary body being shaped as a hollow cylinder, thimble, or disc.

7. A water filtration system comprising:
   a housing having an inlet port fluidly connected to an outlet port; and a filter medium positioned within the housing such that water entering the housing through the inlet port passes through the filter medium before reaching the outlet port, the filter medium comprising components:
   a) from 55 to 80 percent by weight of activated carbon particles having a particle size distribution with a $D_{50}$ in a range of from 70 to 130 micrometers and a $D_{10}$ in a range of from 25 to 50 micrometers;
   b) from 5 to 20 percent by weight of first catalytic activated carbon particles having a particle size distribution with a $D_{50}$ in a range of from 20 to 40 micrometers and a $D_{10}$ in a range of from 2 to 20 micrometers; and
   c) from 10 to 30 percent by weight of a thermoplastic binder, the thermoplastic binder binding at least the activated carbon particles and the catalytic activated carbon particles into a porous unitary body,
   wherein the percent by weight of components a)-c) is based upon a total weight of components a)-c).

8. The water filtration system of claim 7, the housing comprising a head part and a body part, the head part comprising the inlet port and the outlet port, the head part and the body part being mechanically engageable with one another to form a watertight seal.

9. The water filtration system of claim 7, the head part and the body part being mechanically engageable by a motion comprising relative twisting of the head part and the body part.

10. The water filtration system of claim 7, the filter medium further comprising at least one lead removal medium in an amount up to 20 percent by weight.

11. The water filtration system of claim 10, the at least one lead removal medium comprising a cation exchange resin.

12. The water filtration system of claim 7, the filter medium further comprising up to 20 percent by weight of second catalytic activated carbon particles having a particle size distribution with a $D_{50}$ in a range of from 130 to 140 micrometers and a $D_{10}$ in a range of from 70 to 80 micrometers.

13. The water filtration system of claim 7, the thermoplastic binder comprising a thermoplastic polyolefin.

14. The water filtration system of claim 7, the porous unitary body having a conduit in fluid communication with the outlet port.

* * * * *